2,826,087

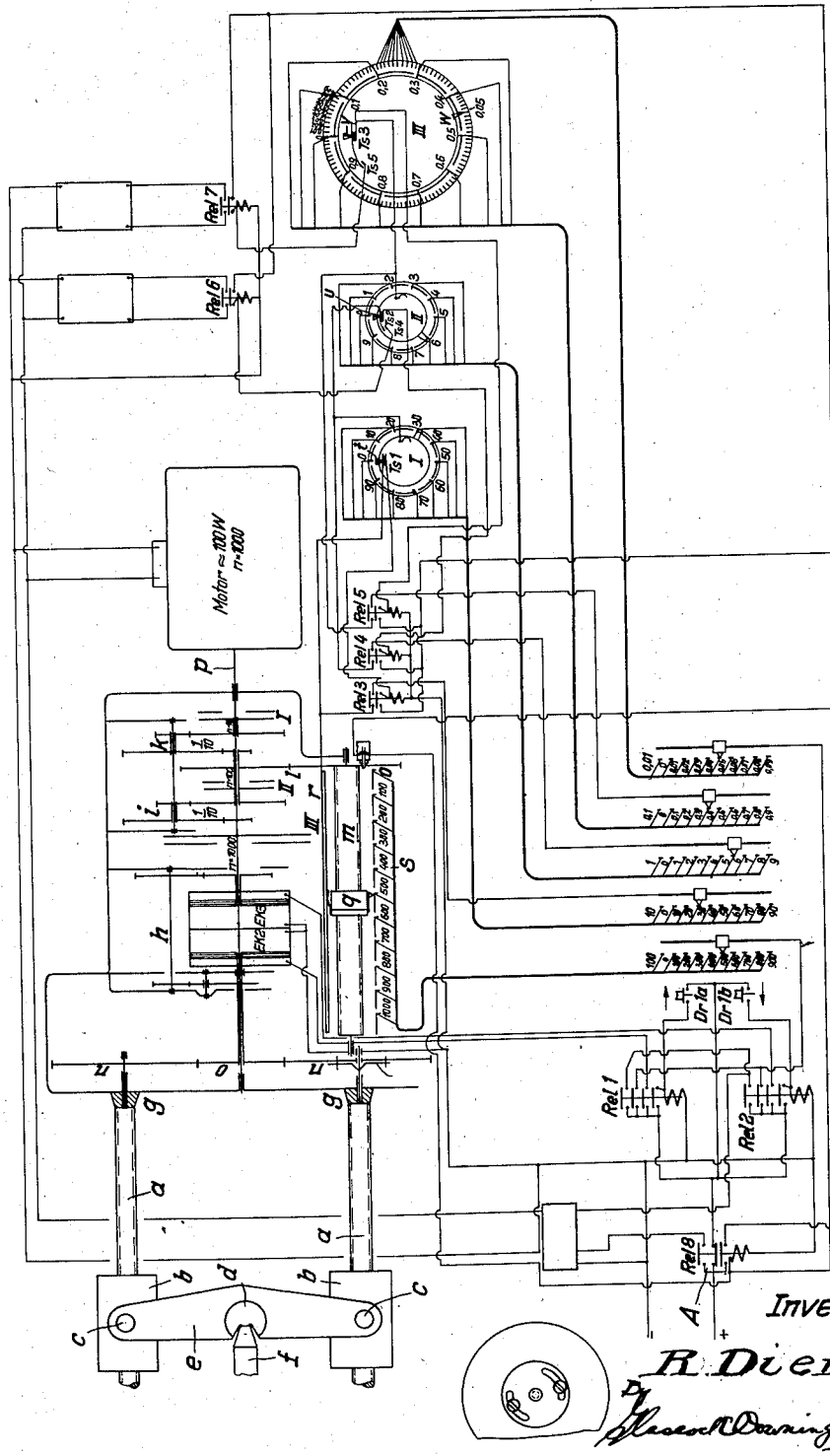

APPARATUS FOR THE AUTOMATIC ADJUSTMENT OF A SLIDE MOVABLE ON A BED, MORE PARTICULARLY IN MACHINE TOOLS

Richard Diener, Berlin-Hermsdorf, Germany, assignor to Berliner Maschinenbau Actien-Gesellschaft vormals L. Schwartzkopf, Berlin, Germany Application June 7, 1954, Serial No. 434,907

Claims priority, application Germany June 12, 1953

4 Claims. (Cl. 74—472)

This invention relates to apparatus for automatically adjusting a slide movable on a bed, more particularly in machine tools, using a pre-selector which controls the required change of position of a stop against which the slide automatically bears after adjustment has been completed.

Apparatus of this kind is known, in which coinciding end measuring means under the influence of the pre-selector automatically enter into certain combinations, so that in this manner the required adjustment of the stop is produced.

The present invention deals with the problem in a different way, noteworthy in that the combinations of end measuring means are dispensed with. The invention consists mainly in this, that the stop is displaceable under the control of a spindle drive associated with a motor-driven counting and switching mechanism, the counting and switching mechanism being controlled in dependence on the adjustment of the pre-selector. In this case also, apparatus is known in which for instance the slide is moved directly by a spindle.

The apparatus according to the present invention is superior to the known devices in that on the one hand, in adjusting the individual working points it is not necessary to re-calculate the measurements starting from a zero point, and the actual dimensions based on the notes on the drawings can be set on the pre-selector, the tool carrier being in any required position whatsoever, and on the other hand the stop is adjusted without loading, and the play present in the spindle and nut threads is neutralised by bringing up the slide, always in the same direction. If it is desired to change over from a first adjustment that has been reached to a further adjustment, it is necessary only to set the corresponding new distance measurement on the pre-selector. For a single machine, as usual two devices are used which operate in directions at right angles to one another, so that it is then possible to cover the whole extent of the workpiece.

A further very important advantage is that the apparatus is of much simpler design and therefore can be manufactured considerably more cheaply than heretofore.

It is accordingly a broad object of the invention to provide an apparatus to govern positioning of a member at different locations in a machine tool.

It is a more specific object of the invention to provide a machine tool structure for preselecting a change of position of a stop member and a driving apparatus for translating the stop member to the new position.

It is another object of the invention to improve on the stop member adjustment structures known in the prior art.

Summarily stated, the invention comprises a machine tool having an adjustable slide movable on a bed and a displaceable stop to terminate the movement of the slide. An electric motor is provided with a gear train and a magnetic clutch to reversibly interconnect the motor gear train and a gear train connected to the stop member. Sliding contacts are connected to the motor, and a group of manual contact series are provided to preselect a desired combination. When the motor is energized it drives the stop member through the selected gear train until the motor driven contacts are in equilibrium with the preselected manual contact series.

Further details of the invention will appear in the course of the following description of one embodiment of the invention, chosen by way of example, with reference to the accompanying drawing.

On spindles $a$, of which the pitch errors are compensated or greatly diminished by suitable selection and rotation of one spindle, are mounted two nuts $b$ one on each spindle. The two nuts are connected by a cross beam $e$ and bolts $c$ in such a manner that the cross beam can assume a slightly inclined position. In the centre of the cross beam is rotatably mounted a stop $d$ which when a pin $f$ is brought up to it ensures full contact of the stop surfaces. When the pin $f$ is brought up, the spindles bear against stationary stops $g$ fixed to the casing. The spindles carry at this end large toothed wheels $n$ both driven by a toothed wheel $o$. On one of the toothed wheels $n$ is an adjusting device which makes it possible to adjust the two nuts to the same height by rotating the spindle. The transmission ratio of the toothed wheels $o$ and $n$, and the pitch of the threads of the spindles $a$, are made such that during one revolution of the motor shaft $p$ the spindle nuts $b$ advance through one millimetre. To the motor shaft $p$ are connected the magnet parts of electric laminated couplings EK2 and EK3. The armature of EK2 is coupled to the toothed wheel $o$. The couplings make it possible either to connect or disconnect the counting mechanism and the spindles. The armatures of the couplings EK2 and EK3 are connected with corresponding toothed wheels of reversing gear $h$ in such a manner that the spindle nuts $b$ move to the right when EK2 is switched on and to the left when EK3 is switched on. A counting mechanism, consisting of three contact discs I, II and III and a spindle $m$, is also driven from the motor shaft $p$. The contact disc III is connected directly to the motor shaft $p$. This disc carries, firstly, ten contact numbers 0, 0.1, 0.2, ... 0.9. Each of these contacts covers 9/100 of the periphery.

In addition to these contacts there is a second series containing one hundred contacts numbered 0, 0.01, 0.02, 0.03 ... 0.09; 0, 0.01, 0.02 ... 0.09; 0, 0.01 .... The 0-contacts of this series lie at the beginning of the contacts 0.1, 0.2. .... The identically numbered contacts of this series are connected together, i. e. all contacts numbered 0, all those numbered 0.01, all those numbered 0.02, and so on. Over both series runs a slide spring which can make a connection between each contact of the second series (0.01 to 0.09) and a contact of the first series (0.1 to 0.9). (0.05 connected to 0.2, above.) During one revolution this spring passes over all of the contacts 0, 0.1 ... 0.9, and the spring is then back at 0. Movement of the slide spring from the beginning of the contact 0 to the beginning of the contact 0.1 thus corresponds to one tenth of a revolution of the motor shaft, i. e. to movement of the spindle nuts $b$ through one tenth of a millimetre. Movement of the slide spring from 0 to 0.01 corresponds to one hundredth of a revolution of the motor shaft, i. e. to movement of the spindle nuts $b$ through one hundredth of a millimetre.

The contact disc II carries ten contacts numbered 0, 1, 2 ... 9. The speed of rotation of the slide spring of this disc is reduced to one-tenth by a reduction gear $i$. Movement of the slide spring from one contact to the next is equivalent to one revolution of the motor shaft and therefore to a movement of the spindle nuts $b$ through one millimetre, and one revolution is equivalent to movement of $b$ through ten millimetres, i. e. to ten revolutions of the motor shaft.

The contact disc I is driven from II, at a speed reduced to one tenth of that of II, through a reduction gear $k$, and carries ten contacts numbered 0, 10, 20 . . . 90. The movement of the slide spring of this contact disc from one contact to another is equivalent to one revolution of the spring of II and therefore to ten revolutions of the motor shaft or movement of the spindle nuts $b$ through ten millimetres, and therefore one revolution of the spring of I is equivalent to movement of the nuts $b$ through one hundred millimetres.

A spindle having a thread pitch of two millimetres is driven from the contact disc II at the same speed as this disc. A nut $q$ mounted on this spindle carries two slide springs of which one slides on a bus bar $r$ and the other on a contact bar $s$. The contact bar $s$ carries ten contacts at intervals of twenty millimetres. The slide spring therefore touches the next contact after ten revolutions of the spindle $q$. The contacts are numbered 0, 100, 200, 300 . . . 900. Since the spindle rotates at the same speed as the spring of the contact disc II, movement of the contact spring from one contact to another on the contact rail $s$ corresponds to movement of the spindle nuts $b$ through 100 millimetres.

A pre-selector comprises five series of contacts, with ten contacts in each series. The ten contacts of the first series are numbered 0, 100, 200 . . . 900; those of the second series 0, 10, 20 . . . 90; those of the third series 0, 1, 2 . . . 9; those of the fourth series 0, 0.1, 0.2 . . . 0.9; and those of the fifth series 0, 0.01, 0.02 . . . 0.09. With each series there is associated an adjusting lever having a sliding contact by which each contact of this series can be connected to a bus bar. Above each lever the pre-selected number appears in a window, so that correct adjustment can be checked.

The individual contacts of the switch discs and of the contact rail $s$ are connected to the identically numbered contacts of the pre-selector by cables.

The entire operation is best explained by means of an example. Pressure on a button $Dr1a$ causes current to be supplied to the coil of a relay $Rel1$ which brings the system into action. Through the first contact the relay immediately receives retaining current so that even when the press button is released the relay $Rel1$ remains switched on; through the second contact, EK2 is switched on, whereby the spindles $a$ are directly coupled to the counting mechanism and the motor shaft. (If the button $Dr1b$ were actuated, EK3 would be switched on, the motor shaft would be coupled with the spindles $b$ through the reversing gear $h$ and the direction of rotation of $o$ would be opposite to that of $p$.) The third contact supplies current to the counting mechanism and the fourth contact switches on the motor at a speed of 1000 R. P. M.

Let it be assumed that the dimension 536.45 has been adjusted on the pre-selector. The counting mechanism coupled to the spindles $a$ now runs until the contact 500 on the rail $s$ is reached. This causes current to be supplied to the switch $Ts1$ which is still open. On the rotating sliding contact on the contact disc 1 there is a stud $t$ which closes the switch $Ts1$ at the end of every hundredth revolution of the motor. Since this switch receives current shortly before the end of the five hundredth revolution, when $Ts1$ is closed by $t$ the relay $Rel3$ is switched on and immediately receives retaining current and, through the operative contact 30 on the pre-selector, makes a connection with the contact 30 on the contact disc 1. In the contact disc II are two switches $Ts4$ and $Ts2$ which are closed, at the end of every tenth revolution, by a stud $u$ on the rotating sliding contact of this switch disc. The switch $Ts4$ is advanced by an amount determined by experiment. When the sliding contact on contact disc I reaches the pre-selected contact 30 supplied with current, both of the switches $Ts2$ and $Ts4$ receive current. When the switch $Ts4$ is closed by the stud $u$, the relay $Rel6$ is actuated and switches the speed of the motor to 500 R. P. M. through the changeover switch. The change-over must be completed when the switch $Ts2$ is closed by the stud $u$. This occurs at the instant of completion of the five hundred and thirtieth revolution of the motor. As a result of the closing of the switch $Ts2$ the relay $Rel4$ responds, immediately receives retaining current and, through the operative contact 6 of the pre-selector, supplies current to the contact 6 on the contact disc II. When the rotating slide spring of this contact disc reaches the contact 6, the two switches $Ts5$ and $Ts3$ receive current. $Ts5$, like $Ts4$, is advanced by an amount determined by experiment. When the stud $v$ on the rotating contact spring $w$ closes the switch $Ts5$, which occurs at the instant of completion of the five hundred and thirty-sixth revolution of the motor, $Rel7$ is switched on and, through the second changeover switch, reduces the speed of rotation of the motor to 6 R. P. M. The time now taken by the contact spring $w$ in getting for instance from contact 0 to contact 0.1 amounts to one second. The reduction of the speed of rotation of the motor to 6 R. P. M. must be completed when the stud $v$ closes the switch $Ts3$. As a result of the closing of this switch, $Rel5$ is switched on and contact 0.4 on the contact disc III is supplied with current. When the slide spring $w$ reaches the contact 0.4 and the next contact 0.05, the circuit is closed. At the same moment the relay 8 is switched on and immediately breaks this circuit. As a result, the coupling EK2 ceases to receive current and spindles $a$ are disconnected from the counting mechanism. At the same time, a reversing relay reverses the direction of rotation of the motor and switches of all relays. The motor now drives the counting mechanism, disconnected from the spindles $a$, backwards until the limit switch at the beginning of the spindle $m$ interrupts the retaining current of the relay $Rel8$. The counting mechanism is thus back at zero and the initial state is re-established. This ensures that every newly pre-selected dimension is always reckoned from the position of the stop $d$.

By adding to the pre-selector a lever having contacts by which any required number of stop pins $f$ at intervals of one thousand millimetres can be brought into position, the range of application of the system can be extended from one thousand millimetres to two or three thousand millimetres or more.

I claim:

1. In a machine tool having an adjustable slide movable on a bed, the combination comprising a displaceable stop operable to terminate slide movement, means to support said stop, means for preselecting a change of position of said stop, and translating means responsive to said last mentioned means to displace said stop to the selected position, the said means to support said stop comprising two threaded spindles having longitudinal axes respectively parallel, a nut carried on each said spindle, and an arm extending between the said nuts and pivotally connected thereto.

2. The invention as set forth in claim 1, wherein said translating means comprises a motor, a gear train connected to said motor, a second gear train connected to the said threaded spindles, a magnetic coupling connected to reversibly interconnect the two said gear trains, and a plurality of contact discs connected to be driven by said motor to a position determined by said preselecting means.

3. The invention as set forth in claim 2, wherein said preselecting means comprises a plurality of manually adjustable contact groups, connectors intercommunicating between said contact groups and said contact discs, and a relay system to energize said discs in sequence whereby upon manual adjustment of said contact groups the said motor will drive the said discs to a balanced state to translate said stop.

4. In a machine tool having an adjustable slide the combination comprising a stop operable to terminate slide movement, a pair of threaded spindles fixed for rotation with their longitudinal axes mutually parallel, a nut carried on each spindle, an arm extending between the said nuts to support the said stop, a motor, a gear train connected to the shaft of said motor, a second gear train connected to drive the said threaded spindles, a magnetic coupling to reversibly interconnect the two gear trains to determine the direction of rotation of the said spindles for translating the stop, a plurality of manually adjustable contact groups, a plurality of sliding contact assemblies connected to the said motor to be driven thereby, a network of conductors interconnecting between the contact group and the contact assemblies, and a relay system connected in said network whereby upon manual adjustment of the said contact group the said relay system acts to energize the contact assemblies in sequence and the motor rotates to move the contact assemblies into a condition corresponding to the adjustment of the contact group and to move the said stop to a new position.

References Cited in the file of this patent

UNITED STATES PATENTS

| | | |
|---|---|---|
| 2,339,435 | Stephan | Jan. 18, 1944 |
| 2,473,506 | Bullard | June 21, 1949 |
| 2,545,053 | Siekmann et al. | Mar. 13, 1951 |
| 2,640,377 | Milholland | June 2, 1953 |
| 2,641,938 | Kylin | June 16, 1953 |
| 2,677,285 | Volk | May 4, 1954 |